United States Patent
Spooner, Sr. et al.

(10) Patent No.: US 6,520,100 B1
(45) Date of Patent: Feb. 18, 2003

(54) TWIN ROW PLANTER

(75) Inventors: Steven Maurice Spooner, Sr., Sylvester, GA (US); Paul Barrett Wood, Overland Park, KS (US); Eric Thomas Jorgensen, Shawnee, KS (US)

(73) Assignee: ATI, Lenexa, KS (US)

( * ) Notice: Subject to any disclaimer, the term of this patent is extended or adjusted under 35 U.S.C. 154(b) by 0 days.

(21) Appl. No.: 09/940,014

(22) Filed: Aug. 27, 2001

Related U.S. Application Data

(63) Continuation of application No. 09/159,731, filed on Sep. 24, 1998.

(51) Int. Cl.[7] .................................................. A01C 7/00
(52) U.S. Cl. .................................. 111/59; 111/9; 111/52
(58) Field of Search ........................... 111/8, 9, 14, 15, 111/18, 22, 25, 34, 35, 52, 59, 60, 66, 69, 92, 93, 94, 914, 923, 924

(56) References Cited

U.S. PATENT DOCUMENTS

| | | | | | |
|---|---|---|---|---|---|
| 2,054,143 | A | * | 9/1936 | Stirling et al. .................. | 267/44 |
| 2,071,324 | A | * | 2/1937 | Bateman et al. ............... | 111/14 |
| 2,365,201 | A | * | 12/1944 | McKahin ....................... | 111/59 |
| 3,742,877 | A | * | 7/1973 | Coffee ........................... | 111/9 |
| 4,294,179 | A | * | 10/1981 | Cayton et al. ............... | 111/914 |
| 4,449,642 | A | * | 5/1984 | Dooley .......................... | 111/34 |
| 4,478,159 | A | * | 10/1984 | Melgoza ........................ | 111/52 |
| 4,485,939 | A | * | 12/1984 | Gafford et al. ................ | 111/73 |
| 4,771,713 | A | * | 9/1988 | Kinzenbaw .................... | 111/52 |
| 5,406,987 | A | * | 4/1995 | Gassner et al. ............ | 140/92.1 |
| 5,787,993 | A | * | 8/1998 | Hundeby et al. ........... | 172/616 |
| 5,974,986 | A | * | 11/1999 | Trisler .......................... | 111/69 |

OTHER PUBLICATIONS

"High Yield 'Twin Row' Corn Planter", Farm Show Magazine, vol. 12–3–7, Dec. 1986.*
"Twin Rows for Corn, Soybeans are Back", Farm Show Magazine, vol. 6–5–23, Dec. 1982.*
"Tiwn–Row Corn and Bean Planter", Farm Show Magazine, vol. 24–2–5, Dec. 1988.*
"A Multi–talented planter", Progressive Farmer, vol. 117—4, starting on p. 46, Feb. 2002.*
"Twin–Row Configuration", Progressive Farmer, vol. 116—10, starting on page ss10, Sep. 2001.*

\* cited by examiner

*Primary Examiner*—Thomas B. Will
*Assistant Examiner*—Nathan Mammen
(74) *Attorney, Agent, or Firm*—Hovey Williams LLP

(57) ABSTRACT

A twin row planter (10) includes planting units (20a–26b) arranged in pairs (20–26). Each pair (20–26) is configured and positioned for planting two rows (78,80) of seeds less than about ten inches apart to produce two rows of crops in order to increase the yield of the plot. With this spacing, the rows (78,80) in each pair are close enough to simulate a single row enabling the use of a conventional cultivator, sprayer or harvesting machine.

41 Claims, 5 Drawing Sheets

TWIN ROW PLANTER

RELATED APPLICATIONS

This is a continuation of application Ser. No. 09/159,731 filed Sep. 24, 1998, which is hereby incorporated by reference herein.

BACKGROUND OF THE INVENTION

1. Field of the Invention

The present invention relates to the field of agricultural planters. More particularly, the invention is concerned with a twin row planter including planting units arranged in pairs. Each pair is configured and positioned for planting two rows of seeds less than about ten inches apart to produce two rows of crops in order to increase the yield of the plot. With this spacing, the rows in each pair are close enough to simulate a single row enabling the use of a conventional cultivator, sprayer or harvesting machine.

2. Description of the Prior Art

Conventional planters include a plurality of evenly spaced planting units connected to a tool bar. The planters are usually on centers of 30, 36 38 or 40 inches which is the spacing required for conventional harvesting machines. It is known that rows planted more closely together can result in a higher yield for a given plot of land, but conventional cultivators, sprayers and harvesting machines cannot handle these closely spaced rows. As a result, crop yield is lost and land use is less efficient.

SUMMARY OF THE INVENTION

The present invention solves the prior art problems mentioned above and provides a distinct advance in the state of the art. More particularly, the planter hereof enables the planting of more closely spaced rows in order to increase crop yield in a manner allowing harvesting by conventional harvesting machines.

The preferred planter includes a plurality of planting units mounted to a tool bar with the planting units arranged in pairs. The pairs of planting units are arranged on standard centers such as thirty or thirty-six inches, for example, but the planting units of each pair are positioned and configured so that the respective rows planted by each pair of planting units are spaced apart less than about ten inches. With this spacing, each set of two rows of resulting crops are close enough to simulate a single row thereby enabling the use of a conventional harvesting machine. Other preferred aspects of the present invention are disclosed herein.

DETAILED DESCRIPTION OF THE PREFERRED EMBODIMENT

Figure 1:
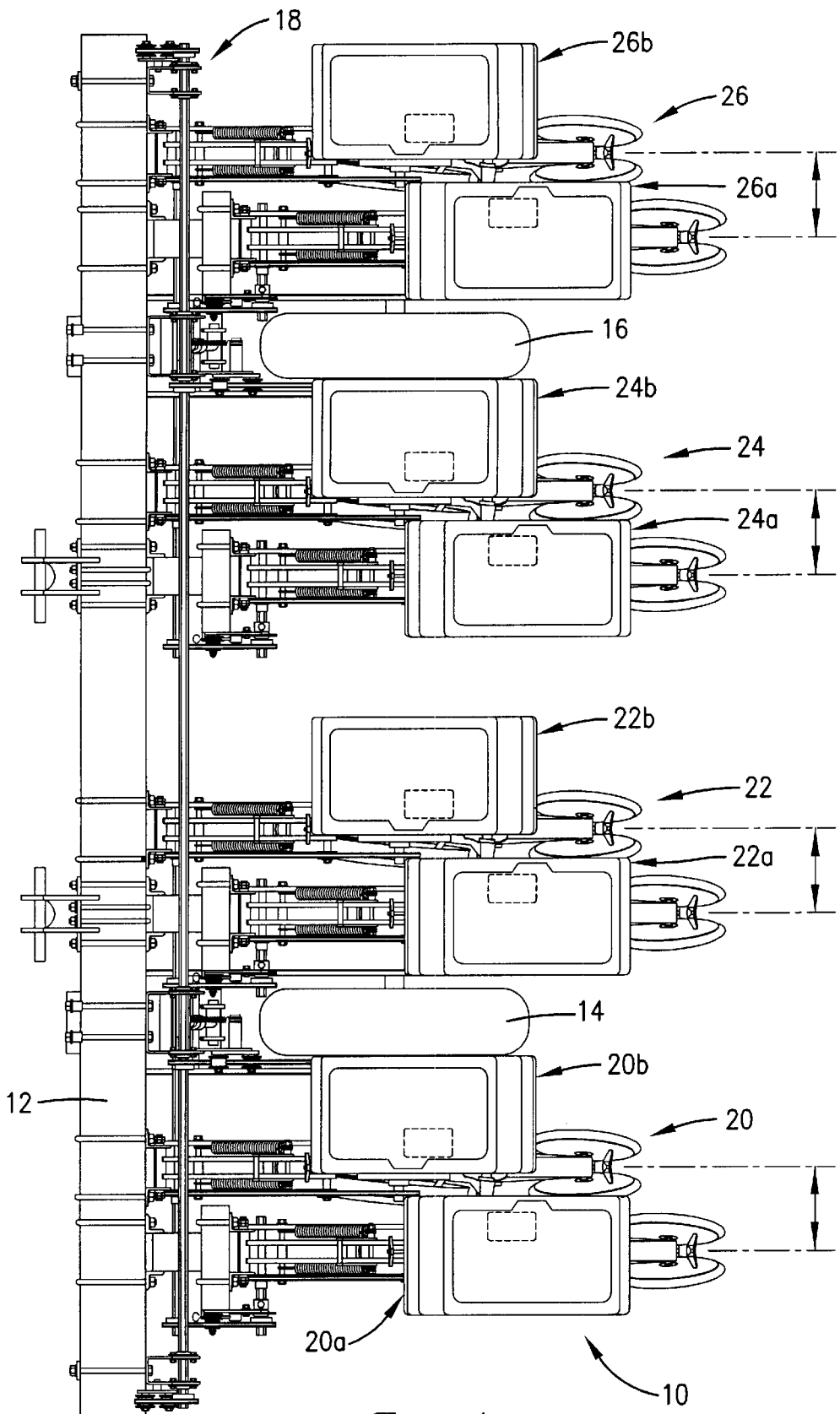
FIG. 1 is a plan view of the preferred planter in accordance with the present invention.

The drawing figures illustrate preferred planter 10 in accordance with the present invention. Referring to FIG. 1, planter 10 includes tool bar 12, drive wheels 14 and 16 coupled with and supporting tool bar 12, drive mechanism 18 and a plurality of planting units 20a, 20b, 22a, 22b, 24a, 24b, 26a and 26b arranged in pairs 20, 22, 24, 26. Tool bar 12, drive wheels 14,16 and drive mechanism 18 are conventional components such as those available on the MONOSEM planter available from ATI, Inc. of Lenexa, Kans. Pairs 20–26 are substantially identical except for their relative positions along tool bar 12.

Referring to pair 20, planting unit 20a includes a furrow opener including a pair of opener discs 28 seed hopper 30, metering assembly 32, a depth gauge wheel assembly including inboard depth gauge wheel 34 and outboard depth gauge wheel 36, and a furrow closer including closer wheels 38. In the usual manner, the planting unit 20a further includes a seed tube 39 that extends downwardly from the metering assembly 32 and between the discs 28 so that the lower outlet end 40 is received in the furrow (see FIGS. 3 and 5). In this regard, the seed tube 39 serves to deposit seed metered by the assembly 32 into the furrow. As best viewed in FIG. 5, inboard depth gauge wheel 34 is narrower than outboard wheel 36 by about half the width thereof. Except for this difference, planting unit 20a is otherwise conventional such as the MONOSEM planting unit available from ATI, Inc.

Mounting structure 42 includes spacer 44 having extender 46 and cross bar 48. U-bolts 50 couple extender 46 with tool bar 12 and U-bolts 52 couple mounting face 54 of planter 20a with cross bar 48. Spacer 44 is configured to space planting unit 20a about six inches from tool bar 12. This places planting unit 20a in a staggered relationship relative to planting unit 20b with portions thereof overlapping as best viewed in FIGS. 1, 2 and 5.

Figure 3:
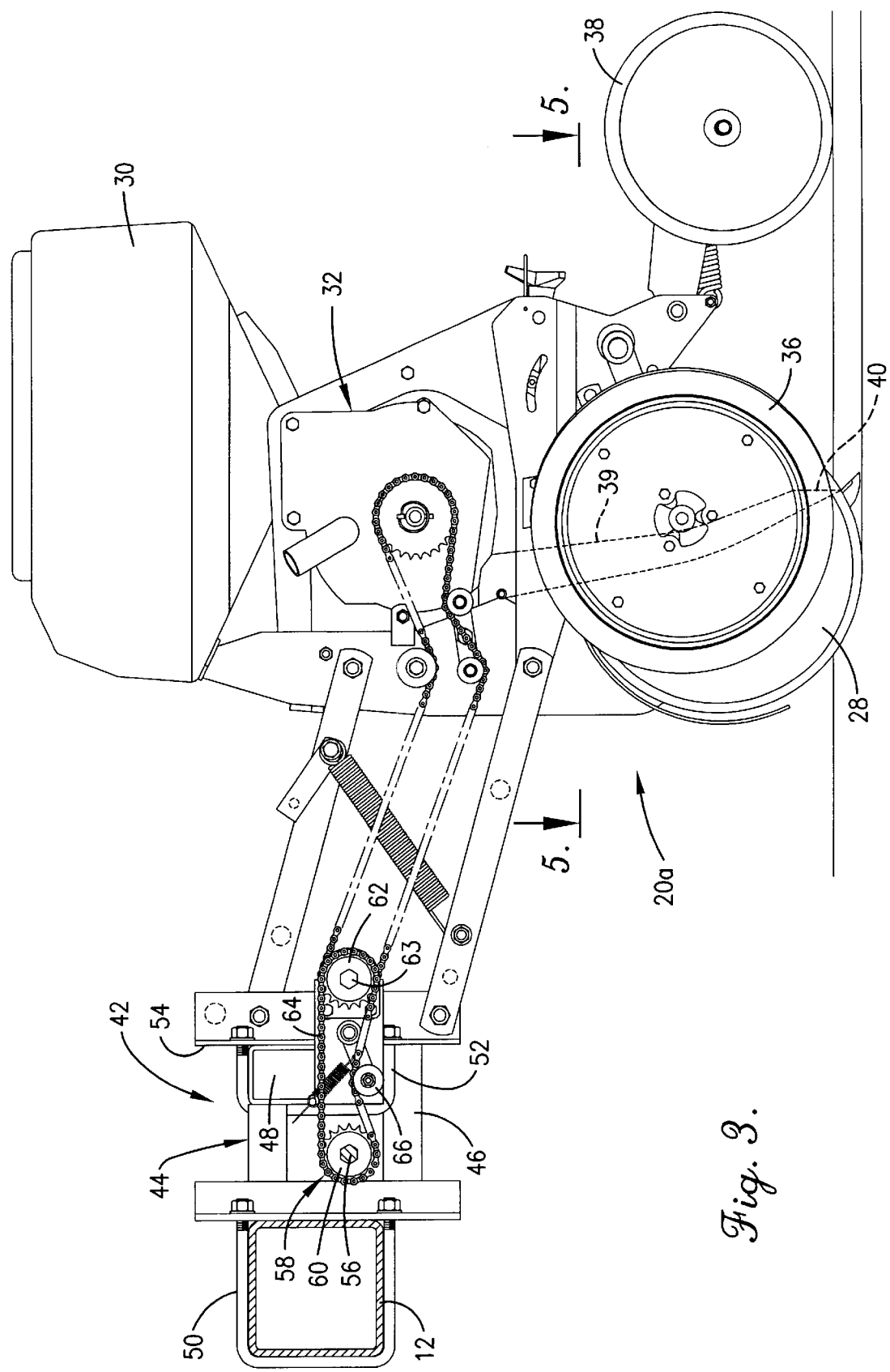
FIG. 3 is a side elevational view in partial section taken along line 3—3 of FIG. 2.
Figure 4:
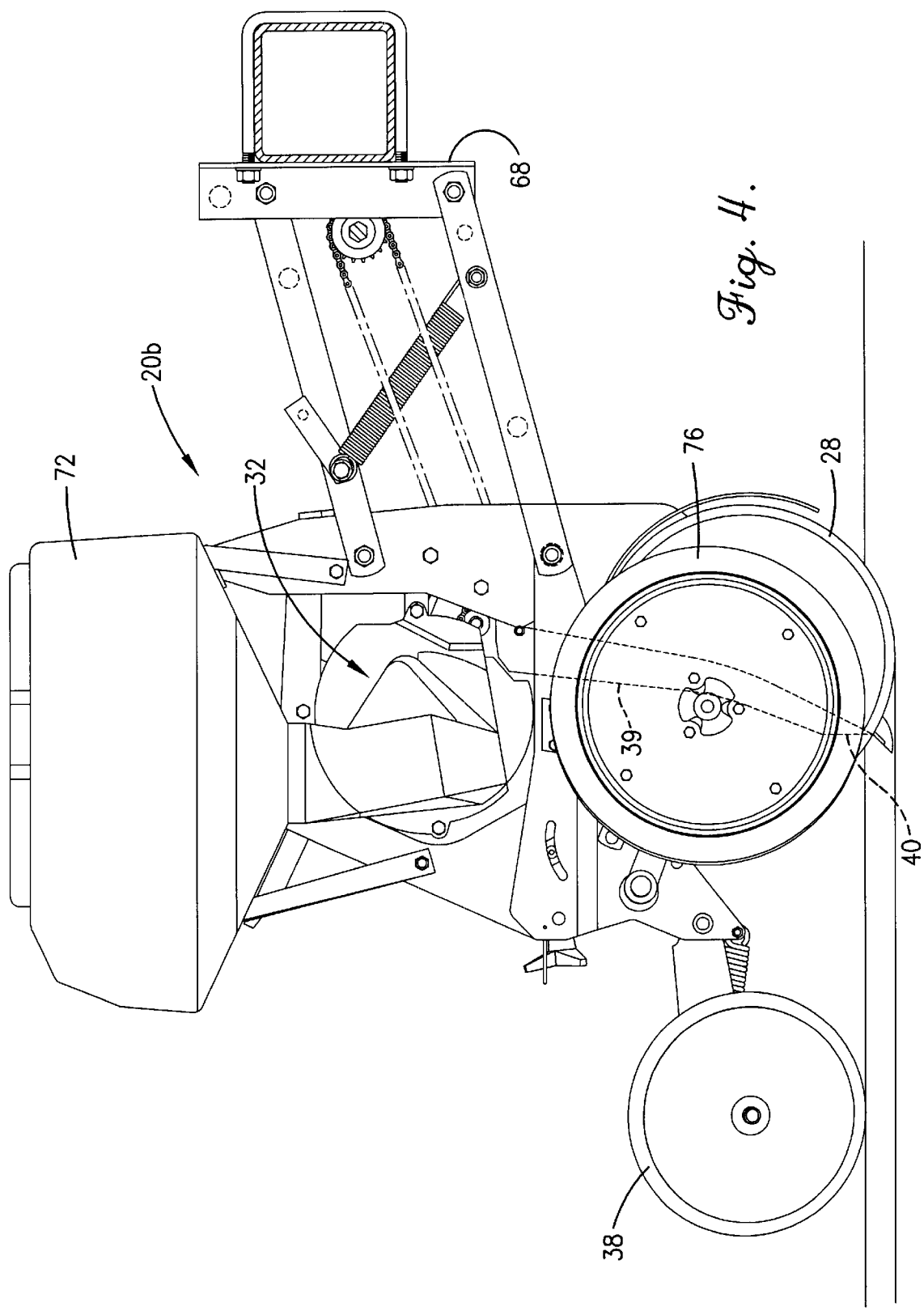
FIG. 4 is a side elevational view in partial section taken along line 4—4 of FIG. 2.

Referring to FIG. 3, drive mechanism 18 includes conventional drive shaft 56. Mounting structure 42 includes power transfer assembly 58 for transferring mechanical power from drive shaft 56 to planting unit 20a to operate metering assembly 32, needed because of the spacing from tool bar 12. Power transfer assembly 58 includes drive sprocket 60 coupled with drive shaft 56, driven sprocket 62 coupled with power shaft 63 of planting unit 20a, chain 64 intercoupling sprockets 60, 62 and idler sprocket 66 engaged with chain 64 to maintain the tension thereof.

Figure 2:
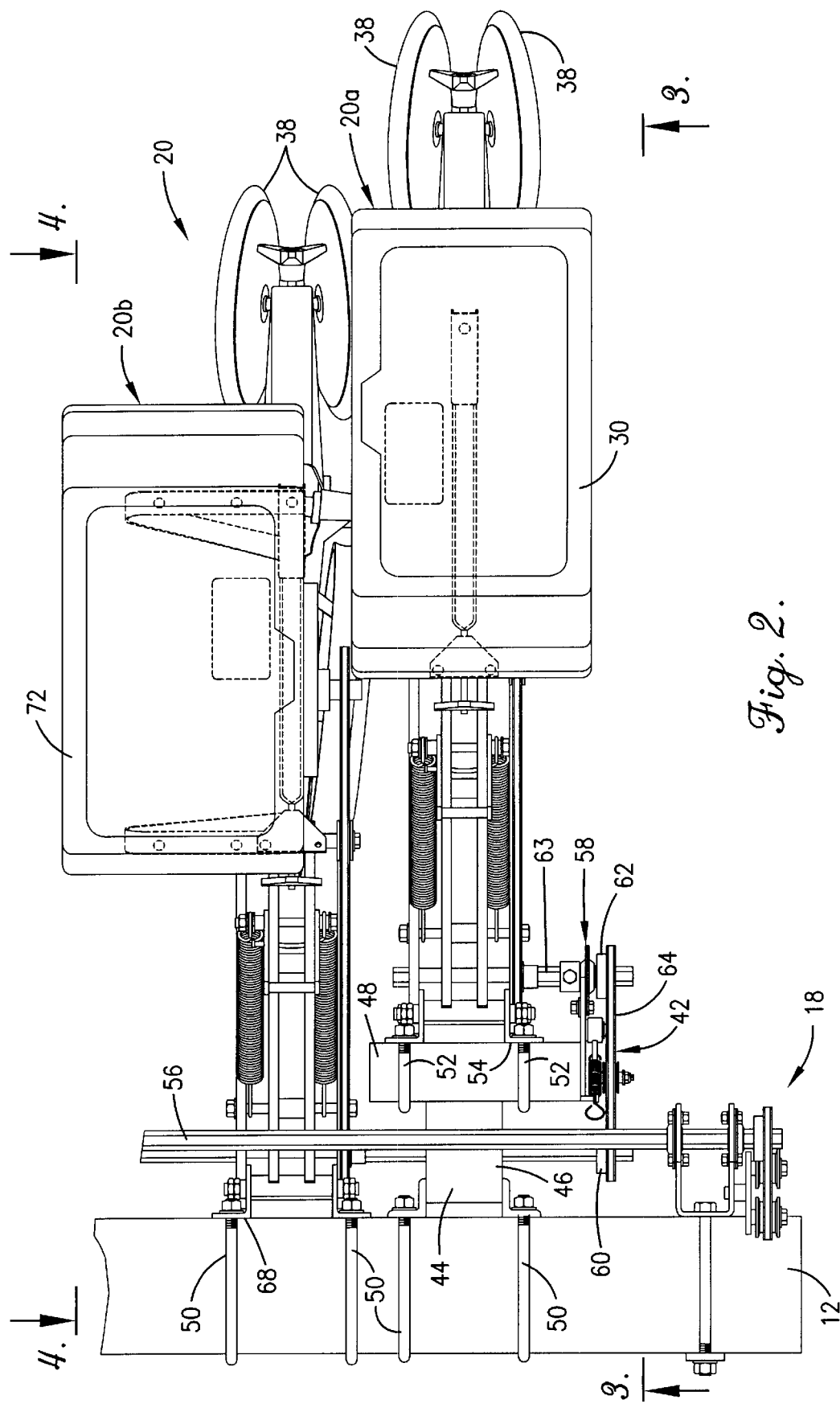
FIG. 2 is a plan view of a pair of planting units of FIG. 1 shown mounted to the tool bar.

Planting unit 20b includes mounting face 68 mounted to tool bar 12 with no spacer therebetween. Unit 20b is otherwise the same as planting unit 20a except for the orientation of seed hopper 72. Referring to FIG. 2, seed hopper 72 is turned on its mounting (compared to hopper 30 of unit 20a) so that it extends substantially to one side of the centerline of planting unit 20b. Planting unit 20b also includes a narrow inboard depth gauge wheel 74 and outboard depth gauge wheel 76.

Figure 5:
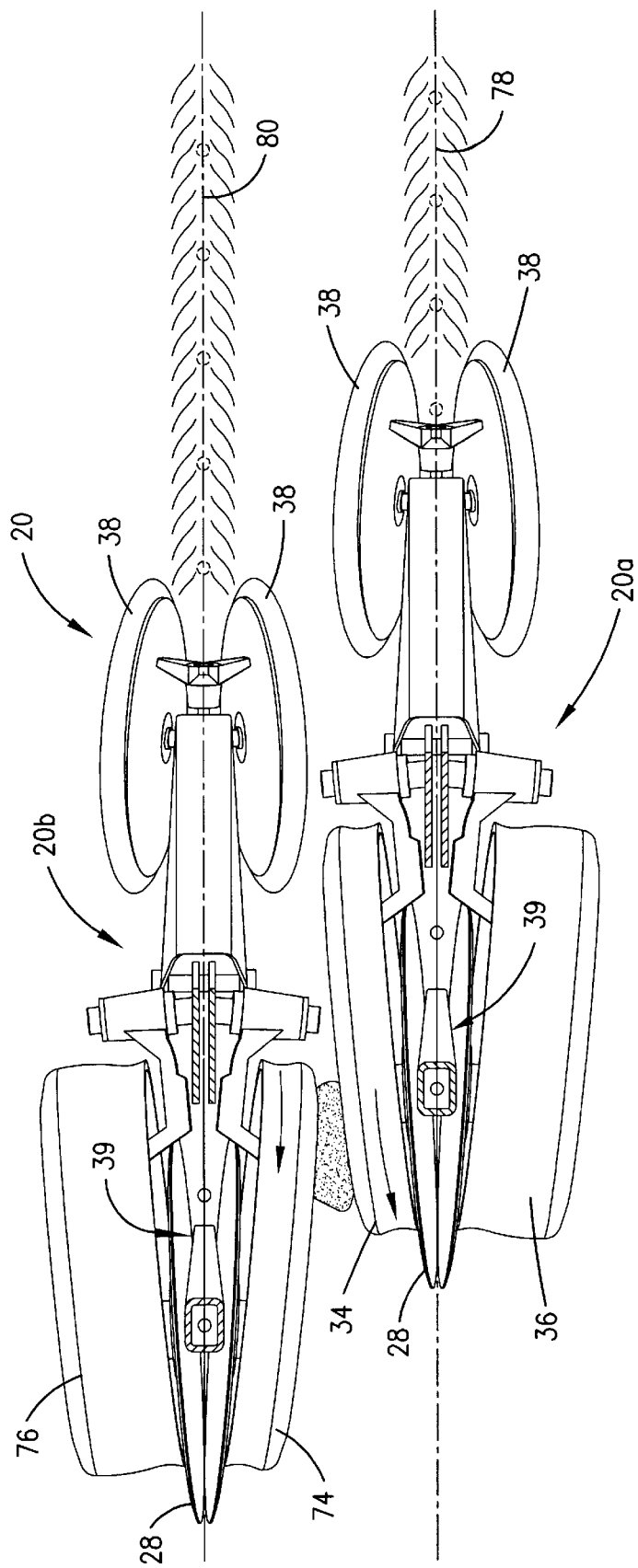
FIG. 5 is a plan view in partial section taken along line 5—5 of FIG. 3.

Referring to FIGS. 1, 2 and 5, planting units 20a,b are positioned on centers of about nine inches in the preferred embodiment. With this arrangement, units 20a,b plant twin rows of seeds 78 and 80 also spaced apart about nine inches as are the resulting rows of crops. This is critical because conventional harvesters cannot adequately handle a crop row with a width greater than ten inches. With a spacing of less than about ten inches, the crops from rows 78,80 simulate a single row to a conventional harvesting machine. The planting units in the other pairs 22–26 are also on nine inch centers, but the pairs themselves are spaced as needed for the harvesting machine that will be used to harvest the crop. In the preferred embodiment, pairs 20–26 are spaced at 30 inches but spacings of 36, 38 and 40 inches are also common.

As best viewed in FIG. 2, the orientation of seed hopper 72 to the right of the centerline of planting unit 20b enables the close spacing between units 20a and 20b. This close spacing is further enabled by the narrow width of inboard depth gauge wheels 34 and 74 as shown in FIG. 5 and by the staggered relationship between units 20a and 20b. As further illustrated by FIG. 5, and the other drawing figures, planting units 20a,b also overlap. In this relationship, the forward portion of inboard depth gauge wheel 34 is adjacent the rearward portion of inboard depth gauge wheel 74. In this relationship, wheels 34 and 74 move in opposite directions where they overlap as planter 10 moves along the ground. This prevents dirt clods, rocks and crop residue from lodging between wheels 34 and 74, which might otherwise be a problem if units 20a,b were not staggered.

In the use of planter 10, metering assemblies 32 of each planting unit 20a–26b are adjusted as needed for the desired seed spacing. Also, the metering assemblies and mounting structures are adjusted, as needed, so that the seeds planted in each row pair are also staggered as illustrated in FIG. 5. This maximizes the spacing between the seeds in the twin rows for maximum yield.

For a conventional planter, the normal seed spacing might be 8 seeds per foot. With the present invention, the metering assemblies can be adjusted so that each places about 6 seeds per foot, for example. For the double row planted by each pair of planting units, this results in 12 seeds per foot, which is a 50% increase in the amount of seed planted. It has been found that this can result in a yield increase of about 25% which substantially offsets the additional cost of seed and increases the overall profit on a given plot.

As those skilled in the art will appreciate, the present invention encompasses many variations in the preferred embodiment described herein. Having described this embodiment, the following is claimed as new and desired to be secured by Letters Patent:

We claim:
1. A row planter comprising:
a tool bar; and
a plurality of planting units mounted to the tool bar,
each of said planting units including
an opener operable to open a furrow in the direction of travel of the planter,
a metering assembly operable to meter seeds from a seed source,
a seed deposit element presenting a seed outlet adjacent the furrow opened by the opener so that seeds from the metering assembly are deposited in the furrow, and
a depth gauge wheel assembly operable to control the depth of the furrow opened by the opener and thereby control the depth of the seeds planted therein,
all of said planting units being arranged in a plurality of multiple-unit sets,
said planting units of each of the sets being positioned and configured so that the seed outlets thereof are spaced apart a planting row spacing,
adjacent ones of said multiple-unit sets cooperatively presenting adjacent seed outlets defining an unplanted space therebetween, with the unplanted space being greater than the planting row spacing,
each of said sets of planting units consisting of a pair of said planting units,
mounting structure positioning said pair of planting units in a staggered relationship with portions thereof overlapping,
each of said planting units of the pair including respective inboard and outboard depth gauge wheels, said inboard wheels being narrower than said outboard wheels and being sufficiently narrow for enabling said staggered relationship.

2. The planter as set forth in claim 1; and
a common drive mechanism supported by the tool bar and configured to provide driving power during planting operations,
said metering assembly of each of the planting units being drivingly connected to the common drive mechanism so as to be powered thereby.

3. The planter as set forth in claim 2,
said common drive mechanism including a single, laterally extending driveshaft to which the metering assembly of each of the planting units is drivingly connected.

4. The planter as set forth in claim 1,
said planting units being mounted to the tool bar in a trailing relationship relative thereto.

5. The planter as set forth in claim 1,
said seed deposit element comprising an elongated tube depending from the metering assembly.

6. The planter as set forth in claim 1,
said pair of planting units being staggered about six inches.

7. The planter as set forth in claim 1,
each of said planting units including a mounting face,
said mounting structure positioning the mounting face of one of said planting units of the pair adjacent said tool bar,
said mounting structure including a spacer positioned between the mounting face of the other of said planting units of the pair and said tool bar in order to place said pair of units in said staggered relationship.

8. The planter as set forth in claim 1,
said inboard wheels presenting respective forward and rearward portions, the forward portion of one of said inboard wheels and the rearward portion of the other of said inboard wheels being adjacent and moving in opposite directions during travel of said planter.

9. The planter as set forth in claim 1,
said metering assemblies of the pair of planting units being adjusted so that the seeds deposited in one of the furrows associated with the pair of planting units are staggered relative to the seeds deposited in the other of the furrows.

10. The planter as set forth in claims 1; and
a drive shaft and power transfer means for transferring mechanical power from said drive shaft to the metering assembly of each of the planting units.

11. The planter as set forth in claim 1,
each of said planting units including a hopper configured to contain seeds to be planted, whereby the hopper serves as the seed source and the planter has a plurality of hoppers equal in number to the planting units.

12. The planter as set forth in claim 1,
said planting row spacing being less than about ten inches.

13. The planter as set forth in claim 1,
said unplanted space being about at least two times greater than said planting row spacing.

14. The row planter as set forth in claim 13,
said planting row spacing being about nine inches,
said unplanted space being at least about twenty-one inches.

15. A row planter comprising:

a tool bar; and a plurality of planting units mounted to the tool bar, each of said planting units including
- an opener operable to open a furrow in the direction of travel of the planter,
- a metering assembly operable to meter seeds from a seed source,
- a seed deposit element presenting a seed outlet adjacent the furrow opened by the opener so that seeds from the metering assembly are deposited in the furrow, and
- a depth gauge wheel assembly operable to control the depth of the furrow opened by the opener and thereby control the depth of the seeds planted therein, all of said planting units being arranged in a plurality of multiple-unit sets, said planting units of each of the sets being positioned and configured so that the seed outlets thereof are spaced apart a planting row spacing, adjacent ones of said multiple-unit sets cooperatively presenting adjacent seed outlets defining an unplanted space therebetween, with the unplanted space being greater than the planting row spacing, each of said sets of planting units consisting of a pair of said planting units, mounting structure positioning said pair of planting units in a staggered relationship with portions thereof overlapping, each of said planting units including a hopper configured to contain seeds to be planted, whereby the hopper serves as the seed source and the planter has a plurality of hoppers equal in number to the planting units, said hoppers of the pair of planting units being at least partly alongside one another, one of said hoppers of the pair of planting units being centered on the associated planting unit, the other of said hoppers of the pair of planting units being positioned substantially to one side of the centerline of the other of the planting units for enabling said staggered relationship.

16. The row planter as set forth in claim 15; and a common drive mechanism supported by the tool bar and configured to provide driving power during planting operations, said metering assembly of each of the planting units being drivingly connected to the common drive mechanism so as to be powered thereby.

17. The row planter as set forth in claim 15, said planting units being mounted to the tool bar in a trailing relationship relative thereto.

18. The row planter as set forth in claim 15, each of said planting units including a mounting face, said mounting structure positioning the mounting face of one of said planting units of each of the pairs adjacent said tool bar, said mounting structure including a spacer positioned between the mounting face of the other of said planting units of each of the pairs and said tool bar in order to place each pair of units in said staggered relationship.

19. The row planter as set forth in claim 15, said planting units of each of the pairs including respective inboard and outboard depth gauge wheels, said inboard wheels being narrower than said outboard wheels and being sufficiently narrow for enabling said staggered relationship, said inboard wheels presenting respective forward and rearward portions, the forward portion of one of said inboard wheels and the rearward portion of the other of said inboard wheels being adjacent and moving in opposite directions during travel of said planter.

20. The row planter as set forth in claim 15, said metering assemblies of the pair of planting units being adjusted so that the seeds deposited in one of the furrows associated with the pair of planting units are staggered relative to the seeds deposited in the other of the furrows.

21. A twin row planter comprising:

a tool bar; and a plurality of planting units mounted to the tool bar, each of said planting units including
- an opener operable to open a furrow in the direction of travel of the planter,
- a metering assembly operable to meter seeds from a seed source, and
- a depth gauge wheel assembly operable to control the depth of the furrow opened by the opener and thereby control the depth of the seeds planted therein, all of said planting units being arranged in a number of pairs to present a corresponding number of harvesting row centerlines, with each harvesting row centerline extending in the direction of travel and being spaced generally equally between the furrows formed by the corresponding pair of planting units, said pairs of planting units being positioned and configured so that adjacent harvesting row centerlines are spaced apart at least about thirty inches, said planting units of each of the pairs being positioned and configured so that the furrows formed thereby are spaced apart less than about ten inches, each of said planting units of each of the pairs including respective inboard and outboard depth gauge wheels, said inboard wheels being narrower than said outboard wheels.

22. The twin row planter as set forth in claim 21; and a common drive mechanism supported by the tool bar and configured to provide driving power during planting operations, said metering assembly of each of the planting units being drivingly connected to the common drive mechanism so as to be powered thereby.

23. The twin row planter as set forth in claim 22, said common drive mechanism including a single, laterally extending driveshaft to which the metering assembly of each of the planting units is drivingly connected.

24. The twin row planter as set forth in claim 21, said planting units being mounted to the tool bar in a trailing relationship relative thereto.

25. The twin row planter as set forth in claim 21, each of said planting units including a hopper configured to contain seeds to be planted, whereby the hopper serves as the seed source and the planter has a plurality of hoppers equal in number to the planting units.

26. The twin row planter as set forth in claim 21; and mounting structure associated with each pair of planting units, said mounting structure being configured to position the planting units of the associated pair in a staggered relationship with portions thereof overlapping.

27. The twin row planter as set forth in claim 26,
said planting units of each of the pairs being staggered about six inches.

28. The twin row planter as set forth in claim 26,
each of said planting units including a mounting face,
said mounting structure positioning the mounting face of one of said planting units of the pair adjacent the tool bar,
said mounting structure including a spacer positioned between the tool bar and the mounting face of the other of the planting units of the pair in order to place the pair of units in said staggered relationship.

29. A twin row planter comprising:
a tool bar; and
a plurality of planting units mounted to the tool bar,
each of said planting units including
an opener operable to open a furrow in the direction of travel of the planter,
a metering assembly operable to meter seeds from a seed source, and
a depth gauge wheel assembly operable to control the depth of the furrow opened by the opener and thereby control the depth of the seeds planted therein,
all of said planting units being arranged in a number of pairs to present a corresponding number of harvesting row centerlines, with each harvesting row centerline extending in the direction of travel and being spaced generally equally between the furrows formed by the corresponding pair of planting units,
said pairs of planting units being positioned and configured so that adjacent harvesting row centerlines are spaced apart at least about thirty inches,
said planting units of each of the pairs being positioned and configured so that the furrows formed thereby are spaced apart less than about ten inches,
each of said planting units including a hopper configured to contain seeds to be planted, whereby the hopper serves as the seed source and the planter has a plurality of hoppers equal in number to the planting units,
each of said pairs of planting units presenting adjacent hoppers that are at least partly alongside one another,
one of said adjacent hoppers being centered on the associated planting unit, the other of said adjacent hoppers being positioned substantially to one side of the centerline of the other of the planting units.

30. The twin row planter as set forth in claim 21,
said metering assemblies of each of the pairs of planting units being adjusted so that the seeds deposited in one of the furrows are staggered relative to the seeds deposited in the other of the furrows.

31. The twin row planter as set forth in claim 29; and
a common drive mechanism supported by the tool bar and configured to provide driving power during planting operations,
said metering assembly of each of the planting units being drivingly connected to the common drive mechanism so as to be powered thereby.

32. The twin row planter as set forth in claim 29,
said planting units being mounted to the tool bar in a trailing relationship relative thereto.

33. The twin row planter as set forth in claim 29,
said planting units of each of the sets including respective inboard and outboard depth gauge wheels, said inboard wheels being narrower than said outboard wheels,
said inboard wheels presenting respective forward and rearward portions, the forward portion of one of said inboard wheels and the rearward portion of the other of said inboard wheels being adjacent and moving in opposite directions during travel of said planter.

34. The twin row planter as set forth in claim 29,
said metering assemblies of the pair of planting units being adjusted so that the seeds deposited in one of the furrows associated with the pair of planting units are staggered relative to the seeds deposited in the other of the furrows.

35. A twin row planter comprising:
a tool bar; and
a plurality of planting units mounted to the tool bar,
each of said planting units including
an opener operable to open a furrow in the direction of travel of the planter,
a metering assembly operable to meter seeds from a seed source,
a seed deposit element presenting a seed outlet adjacent the furrow opened by the opener so that seeds from the metering assembly are deposited in the furrow, and
a depth gauge wheel assembly operable to control the depth of the furrow opened by the opener and thereby control the depth of the seeds planted therein,
all of said planting units being arranged in a number of pairs,
said planting units of each of the pairs being positioned and configured so that the seed outlets thereof are spaced apart a planting row spacing,
adjacent ones of said pairs cooperatively presenting adjacent seed outlets defining an unplanted space therebetween, with the unplanted space being greater than the planting row spacing,
mounting structure positioning the planting units of each of the pairs in a staggered relationship with portions thereof overlapping,
said planting units of each of the pairs including respective inboard and outboard depth gauge wheels, said inboard wheels being narrower than said outboard wheels and being sufficiently narrow for enabling said staggered relationship,
said inboard wheels presenting respective forward and rearward portions, the forward portion of one of said inboard wheels and the rearward portion of the other of said inboard wheels being adjacent and moving in opposite directions during travel of said planter.

36. The twin row planter as set forth in claim 35; and
a common drive mechanism supported by the tool bar and configured to provide driving power during planting operations,
said metering assembly of each of the planting units being drivingly connected to the common drive mechanism so as to be powered thereby.

37. The twin row planter as set forth in claim 35,
said planting units being mounted to the tool bar in a trailing relationship relative thereto.

38. The twin row planter as set forth in claim 35, each of said planting units including a mounting face, said mounting structure positioning the mounting face of one of said planting units of each of the pairs adjacent said tool bar, said mounting structure including a spacer positioned between the mounting face of the other of said planting units of each of the pairs and said tool bar in order to place each pair of units in said staggered relationship.

39. A row planter comprising:

a tool bar; and a plurality of planting units mounted to the tool bar, each of said planting units including
- an opener operable to open a furrow in the direction of travel of the planter,
- a metering assembly operable to meter seeds from a seed source,
- a seed deposit element presenting a seed outlet adjacent the furrow opened by the opener so that seeds from the metering assembly are deposited in the furrow, and
- a depth gauge wheel assembly operable to control the depth of the furrow opened by the opener and thereby control the depth of the seeds planted therein, said planting units being arranged in a number of multiple-unit sets, said planting units of each of the sets being positioned and configured so that adjacent seed outlets thereof are spaced apart a planting row spacing, adjacent ones of said multiple-unit sets cooperatively presenting adjacent seed outlets defining an unplanted space therebetween, with the unplanted space being devoid of any seed outlet and greater than the planting row spacing, mounting structure positioning the planting units of each of the sets in a staggered relationship with portions thereof overlapping, said planting units of each of the sets including respective inboard and outboard depth gauge wheels, said inboard wheels being narrower than said outboard wheels and being sufficiently narrow for enabling said staggered relationship, said inboard wheels presenting respective forward and rearward portions, the forward portion of one of said inboard wheels and the rearward portion of the other of said inboard wheels being adjacent and moving in opposite directions during travel of said planter.

40. The planter as set forth in claim 39; and a common drive mechanism supported by the tool bar and configured to provide driving power during planting operations, said metering assembly of each of the planting units being drivingly connected to the common drive mechanism so as to be powered thereby.

41. The planter as set forth in claim 39, said planting units being mounted to the tool bar in a trailing relationship relative thereto.

\* \* \* \* \*